US008976734B2

(12) United States Patent
Tong et al.

(10) Patent No.: US 8,976,734 B2
(45) Date of Patent: *Mar. 10, 2015

(54) HYBRID ARQ SCHEMES WITH SOFT COMBINING IN VARIABLE RATE PACKET DATA APPLICATIONS

(71) Applicant: Apple Inc., Cupertino, CA (US)

(72) Inventors: Wen Tong, Ottawa (CA); Leo L. Strawczynski, Ottawa (CA); Shalini S. Periyalwar, Plano, TX (US); Claude Royer, Hull (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,589

(22) Filed: Aug. 14, 2013

(65) Prior Publication Data

US 2013/0329644 A1    Dec. 12, 2013

Related U.S. Application Data

(63) Continuation of application No. 13/556,736, filed on Jul. 24, 2012, now Pat. No. 8,681,705, which is a
(Continued)

(51) Int. Cl.
*H04W 28/04* (2009.01)
*H04L 1/00* (2006.01)
*H04L 1/18* (2006.01)

(52) U.S. Cl.
CPC ............ *H04W 28/04* (2013.01); *H04L 1/0002* (2013.01); *H04L 1/1816* (2013.01); *H04L 1/1819* (2013.01); *H04L 1/1845* (2013.01); *H04L 1/0066* (2013.01)
USPC ........... 370/328; 370/349; 370/465; 714/751; 714/776

(58) Field of Classification Search
CPC ..................................... H04W 28/04
USPC ........... 370/328, 349, 465; 714/751, 776, 753
See application file for complete search history.

(56) References Cited

U.S. PATENT DOCUMENTS 3,916,379 A * 10/1975 Dulaney et al. ............... 714/704
5,490,168 A *  2/1996 Phillips et al. ............... 375/224
(Continued)

FOREIGN PATENT DOCUMENTS

EP    0938207    8/1999
EP    0948154    10/1999
(Continued)

OTHER PUBLICATIONS

Falahati, Sorour et al., "Hybrid Type-11 ARQ Schemes with Adaptive Modulation Systems for Wireless Channels," IEEE Vehicular Technology Conference (VTS 1999), vol. 5, Sep. 19-22, 1999, Amsterdam, Netherlands, pp. 2691-2695.
(Continued)

*Primary Examiner* — Rasheed Gidado
(74) *Attorney, Agent, or Firm* — Meyertons, Hood, Kivlin, Kowert & Goetzel, P.C.

(57) ABSTRACT

A system and method for transmitting high speed data on fixed rate and for variable rate channels. The system and method provides the flexibility of adjusting the data rate, the coding rate, and the nature of individual retransmissions. Further, the system and method supports partial soft combining of retransmitted data with previously transmitted data, supports parity bit selection for successive retransmissions, and supports various combinations of data rate variations, coding rate variations, and partial data transmissions.

20 Claims, 12 Drawing Sheets

Related U.S. Application Data continuation of application No. 12/344,933, filed on Dec. 29, 2008, now Pat. No. 8,254,284, which is a continuation of application No. 11/435,455, filed on May 16, 2006, now Pat. No. 7,483,389, which is a continuation of application No. 09/764,660, filed on Jan. 18, 2001, now Pat. No. 7,072,307.

(60) Provisional application No. 60/177,055, filed on Jan. 20, 2000.

(56) References Cited

U.S. PATENT DOCUMENTS

| | | | |
|---|---|---|---|
| 5,600,754 | A | 2/1997 | Gardner et al. |
| 5,721,745 | A | 2/1998 | Hladik et al. |
| 5,983,384 | A | 11/1999 | Ross |
| 6,047,007 | A * | 4/2000 | Munday et al. ............ 370/545 |
| 6,138,260 | A | 10/2000 | Ketseoglou |
| 6,189,123 | B1 * | 2/2001 | Anders Nystrom et al. .. 714/751 |
| 6,202,189 | B1 | 3/2001 | Hinedi et al. |
| 6,275,488 | B1 | 8/2001 | Cudak et al. |
| 6,308,294 | B1 * | 10/2001 | Ghosh et al. ............... 714/751 |
| 6,370,669 | B1 | 4/2002 | Eroz et al. |
| 6,438,723 | B1 | 8/2002 | Kalliojärvi |
| 6,571,366 | B1 | 5/2003 | Doetsch et al. |
| 6,625,179 | B1 | 9/2003 | Doetsch et al. |
| 6,625,226 | B1 * | 9/2003 | Gersho et al. ............. 375/285 |
| 6,694,478 | B1 | 2/2004 | Martinian et al. |
| 6,771,705 | B2 * | 8/2004 | Kenney et al. ............ 375/267 |
| 6,778,558 | B2 | 8/2004 | Balachandran et al. |
| 6,892,342 | B2 * | 5/2005 | Eroz et al. ................. 714/755 |
| 6,892,343 | B2 | 5/2005 | Sayood et al. |

FOREIGN PATENT DOCUMENTS

| | | |
|---|---|---|
| EP | 0964534 | 12/1999 |
| JP | 01-272333 | 10/2001 |
| JP | 07-336331 | 12/2007 |
| WO | 9848517 | 10/1998 |

OTHER PUBLICATIONS

Kallel, S., "Analysis of a Type II Hybrid ARQ Scheme with Code Combining," IEEE Transactions on Communications, vol. 38, No. 8, 1990, pp. 1133-1137.

Kallel, S., "Complementary Punctured Convolutional (CPC) Codes and Their Applications," IEEE Transactions on Communications, vol. 43, No. 6, Jun. 1, 1995, pp. 2005-2009.

Liu, Hang et al., "Performance of H.263 Video Transmission over Wireless Channels Using Hybrid ARQ," IEEE Journal on Selected Areas in Communications, vol. 15, No. 9, Dec. 1997, pp. 1775-1786.

Shacham, N., et al., "An Adaptive Hybrid ARQ Algorithm for Radio Channels," IEEE International Conference on Communications, Jun. 23, 1985, pp. 1390-1394.

Siemens AG, "Support of Hybrid ARQ Type II/III in the Physical Layer," TSG-RAN Working Group 1 meeting #4, Shin-Yokohama, Japan (18) 19-20, Apr. 1999, pp. 1-4.

Non-Final Rejection mailed May 3, 2005, For U.S. Appl. No. 09/764,660, pp. 1-6.

Non-Final Rejection mailed May 6, 2008, for U.S. Appl. No. 11/435,455, pp. 1-7.

Non-Final Rejection mailed Sep. 8, 2004, for U.S. Appl. No. 09/764,660, pp. 1-8.

Notice of Allowance in U.S. Appl. No. 09/764,660 issued Feb. 10, 2006, pp. 1-4.

Notice of Allowance in U.S. Appl. No. 11/435,455 issued Oct. 31, 2008, pp. 1-4.

Office Action in U.S. Appl. No. 09/764,660 issued May 3, 2005, pp. 1-6.

Office Action in U.S. Appl. No. 09/764,660 issued Sep. 8, 2004, pp. 1-8.

Office Action in U.S. Appl. No. 11/435,455 issued May 6, 2008, pp. 1-7.

Election/Restriction Requirement in U.S. Appl. No. 09/764,660 issued Jun. 14, 2004, pp. 1-4.

Final Office Action in U.S. Appl. No. 09/764,660 issued Nov. 3, 2005, pp. 1-6.

International Search Report in Application No. PCT/1801/00042 mailed Jun. 6, 2001, pp. 1-3.

\* cited by examiner

FIG. 8

| | 1ST TRANS. | 1ST RETRANS. | 2ND RETRANS. | 3RD RETRANS. |
|---|---|---|---|---|
| S : X | 1,1 | 1,1 | 1,1 | 1,1 |
| $P_1$ : $Y_0$ | 1,0 | 0,0 | 1,0 | 0,0 |
| $P_3$ : $Y_1$ | 0,0 | 1,0 | 0,0 | 1,0 |
| $P_2$ : $Y_0'$ | 0,1 | 0,0 | 0,1 | 0,0 |
| $P_4$ : $Y_1'$ | 0,0 | 0,1 | 0,0 | 0,1 |

FIG. 11

| | 1ST TRANS. | 1ST RETRANS. | 2ND RETRANS. | 3RD RETRANS. | 4TH RETRANS. |
|---|---|---|---|---|---|
| X | 1,1,1,1 | 1,1,1,1 | 1,1,1,1 | 1,1,1,1 | 1,1,1,1 |
| $Y_0$ | 0,0,0,0 | 0,0,0,0 | 0,0,0,0 | 0,0,0,0 | 0,0,0,0 |
| $Y_1$ | 0,0,0,0 | 0,0,1,0 | 0,1,1,0 | 1,1,1,0 | 1,1,1,1 |
| $Y_0'$ | 0,0,0,0 | 0,0,0,0 | 0,0,0,0 | 0,0,0,0 | 0,0,0,0 |
| $Y_1'$ | 0,0,0,0 | 0,0,1,0 | 0,1,1,0 | 1,1,1,0 | 1,1,1,1 |

HYBRID ARQ SCHEMES WITH SOFT COMBINING IN VARIABLE RATE PACKET DATA APPLICATIONS

CROSS-REFERENCE TO RELATED APPLICATION

The present application is a continuation of U.S. Utility application Ser. No. 11/435,455, filed May 16, 2006, now issued as U.S. Pat. No. 7,483,389, which is a continuation of U.S. Utility application Ser. No. 09/764,660, filed Jan. 18, 2001, now issued as U.S. Pat. No. 7,072,307, which claims priority pursuant to 35 U.S.C. Sec 119(e) to U.S. Provisional Application Ser. No. 60/177,055, filed Jan. 20, 2000, all of which are hereby incorporated by reference in its entirety.

BACKGROUND

1. Technical Field

The present invention relates generally to cellular wireless communication networks; and more particularly to a method of reliably transmitting high speed data within such a cellular wireless communication network.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice communications, they are now called upon to support data communications as well.

The demand for data communication services has exploded with the acceptance and widespread use of the Internet. While data services have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless network data communications will only increase with time. Thus wireless networks are currently being created/modified to service these burgeoning data service demands.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless network, consider the structure and operation of a cellular wireless network.

Cellular wireless networks include a "network infrastructure" that wirelessly communicates with user terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of user terminals operating in its cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet.

The wireless link between the base station and the MS is defined by one of a plurality of operating standards, e.g., AMPS, TDMA, CDMA, GSM, etc. These operating standards, as well as new 3G and 4G operating standards define the manner in which the wireless link may be allocated, setup, serviced and torn down. These operating standards must set forth operations that will be satisfactory in servicing both voice and data communications.

Transmissions from base stations to user terminals are referred to as "forward link" transmissions while transmissions from user terminals to base stations are referred to as "reverse link" transmissions. Generally speaking, the volume of data transmitted on the forward link exceeds the volume of data transmitted on the reverse link. Such is the case because data users typically issue commands to request data from data sources, e.g., web servers, and the web servers provide the data to the user terminals.

The transmissions of high speed packet data (HSD) from base stations to user terminals, and vice versa, suffer from errors for many reasons. Errors may be particularly acute in applications with low bit energy to noise power spectral density ratio (Eb/No). In these situations, a conventional Forward Error Correction (FEC) (e.g., convolutional coding) alone often does not meet the maximum bit error rate (BER) required for the operation. In such a case, combining the FEC scheme in conjunction with a data retransmission scheme such as Automatic Repeat ReQuest (ARQ) is often employed to enhance performance. This combination of FEC and ARQ is generally known as Hybrid ARQ.

Generally speaking, there are three classes of hybrid ARQ techniques. Type 1 Hybrid ARQ schemes include data and parity bits for both error detection and correction in every transmitted packet. If an uncorrectable error is detected at the receiver, the received packet is rejected and a retransmission is requested. The transmitter sends the original packet again at the same data rate. A disadvantage of this scheme is that the decoder discards uncorrectable packets even if they might contain some useful information.

In a Type II Hybrid ARQ scheme, the concept of code puncturing is used. A first transmitted packet contains the data and some of the parity bits for decoding. If this transmission fails to be received correctly, the data is stored and a retransmission is requested. The transmitter then sends the supplemental bits, which were previously deleted by puncturing. The receiver then combines the stored data with the received bits to produce a lower rate decoding. If the combined decoding fails, the process is repeated, until the decoding rate is reduced to that of the mother code. The Type II Hybrid ARQ scheme is thus more efficient that the Type I Hybrid ARQ scheme because it uses all received data.

A significant drawback of the Type II Hybrid ARQ scheme is that each of the retransmitted packets does not independently contain enough information to decode the data. If the initially transmitted data packet suffers from header errors, for example, the retransmissions of parity bits will be useless and the data cannot be recovered. A number of special cases of Type II Hybrid ARQ schemes exist. Type II Hybrid ARQ schemes are also referred to as incremental redundancy schemes.

In a Type III Hybrid ARQ scheme, a starting code rate is chosen to match the channel noise conditions, and complementary transmissions are combined prior to decoding. While the decoder need not rely on previously received sequences for decoding, these sequences can be used to improve the performance of the code. Complementary convolutional codes have been proposed as FEC codes for this scheme.

Another technique developed to address such deficiencies in transmissions includes the more recently developed turbo code method. Turbo coding for FEC has proven to be very powerful for correction of corrupted data communicated across noisy channels. One form of turbo coding is concatenated convolutional coding (PCCC). Turbo coding processes a block of data bits using a transmitting turbo encoder that encodes the block of data and a receiving turbo decoder that decodes the encoded block. For data transmissions (and voice transmissions), the data stream is divided into blocks, or data packets, of N data bits, and turbo coding processes these individual data packets. The original data bits are provided as inputs to the turbo encoder. The turbo encoder generally includes two convolution recursive encoders, which together provide an output (codeword) including both systematic data bits (from the original data bits provided) and additional parity bits.

The first encoder operates on the input systematic data bits and outputs code bits including both the systematic data bits and parity bits. The turbo encoder also includes an interleaver, which interleaves the systematic data bits before feeding the data bits into the second encoder. The second encoder operates on the interleaved data bits and outputs code bits including parity bits. The output of the first and second encoder are concurrently processed and transmitted to the receiver decoder in transmission blocks, which then decodes the transmission block to generate decoded data bits.

Each of these Hybrid ARQ schemes has its benefits and its shortcomings. Thus, there exists a need for an improved Hybrid ARQ scheme that overcomes these shortcomings. Further, there exists a need for an improved Hybrid ARQ scheme that may be efficiently used with Turbo coding operations.

SUMMARY OF THE INVENTION

In order to overcome the above-described shortcomings of prior operations, a system and method constructed according to the present invention employs an adaptive rate transmission procedure for high speed data applications to maximize the total data throughput. The system and method of the present invention further provide a procedure for transmitting data, which minimizes retransmission and efficiently uses the air interface. Moreover, the system and method of the present invention provides a transmission procedure with the flexibility to combine later retransmissions of data with earlier retransmissions of the original transmission to increase the signal to noise ratio and increase overall transmission efficiency. Moreover, the system and method of the present invention also provides a transmission procedure with particular advantages for applications where at any given instant the transmission channel is not shared, but dedicated to a particular user.

According to one embodiment of the present invention, a data packet is transmitted on a variable rate channel from a transmitter to a receiver. This operation includes transmitting a first transmission block portion and a second transmission block portion in a first transmission block at a first data transmission rate. Upon receipt, the receiver decodes the first transmission block in a first decoding. If the first decoding is not successful, the transmitter transmits, in a second transmission, the first transmission block portion at a second transmission rate different from the first transmission rate. The first transmission block and the second transmission block are then soft combined and decoded. If this decoding is not successful, the second transmission block portion is transmitted at a second transmission rate different from the first transmission rate. All transmission blocks are then soft combined and decoded. These operations may be extended to additional transmissions at differing transmission rates, soft combining of all received transmission blocks, and decoding.

According to another embodiment of the present invention, a first transmission includes data bits and first parity bits that may be transmitted on a variable rate channel. The first transmission is decoded in a first decoding at a first decoding rate. If the first decoding is not successful, a second transmission is made that includes the data bits and second parity bits, where the second parity bits are different from the first parity bits. The first and second transmissions are then soft combined to form a first combined transmission that is then decoded in a second decoding at a second decoding rate. If the second decoding is not successful, operation according to this embodiment may be extended to retransmit data bits and other parity bits. All received data and parity bits are then combined and decoding is attempted at a decoding rate commensurate to the number of parity bits included.

According to yet another embodiment of the present invention, a first transmission that includes a set of data bits is transmitted on a variable rate channel. The first transmission is then decoded in a first decoding at a first decoding rate. If the first decoding was not successful, a second transmission is made that includes the set of data bits at a second coding rate less than the first data transmission rate. The first transmission and the second transmission are then soft combined to form a first combined transmission that is decoded in a second decoding at a second decoding rate. If the second decoding is not successful, an additional transmission at another coding rate is then made and decoding is performed at an appropriate decoding rate. If the decoding is not successful, soft combining is then performed for all received transmissions and decoding of the combined transmissions is then performed at an appropriate decoding rate. These operations may be repeated until successful decoding occurs.

A further embodiment of the present invention generalizes the methods proposed above to deliver adaptive coding through employing both the variable data rate option mentioned in the first embodiment above and the variable coding rate option mentioned in the subsequent embodiments to generate an arbitrary rate code. An extension of this embodiment yields significant efficiency in that an increased transmission data rate due to improved channel conditions will allow a variety of options, e.g., introduction of further redundancy by repetition, or multiplexing of the retransmission data with new data to the user(s).

In the embodiments presented, partial or full soft combining may be performed at the receiver, depending on whether some of the data bits were retransmitted or all of the data bits were retransmitted due to the variable rate channel.

In one operation according to the present invention, a base station serves as the transmitter while a user terminal serves as the receiver. In another operation according to the present invention, the user terminal serves as the transmitter while the base station serves as the receiver. Thus, the present invention may be implemented on both forward link and reverse link operations. The description provided herein should be viewed from each of these perspectives.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 8 is a puncturing table, which illustrates an exemplary puncturing procedure for use with the second embodiment of the present invention.

FIG. 11 is a puncturing table that illustrates an exemplary puncturing procedure for use with the third embodiment of the present invention.

DETAILED DESCRIPTION OF THE DRAWINGS

Figure 1:
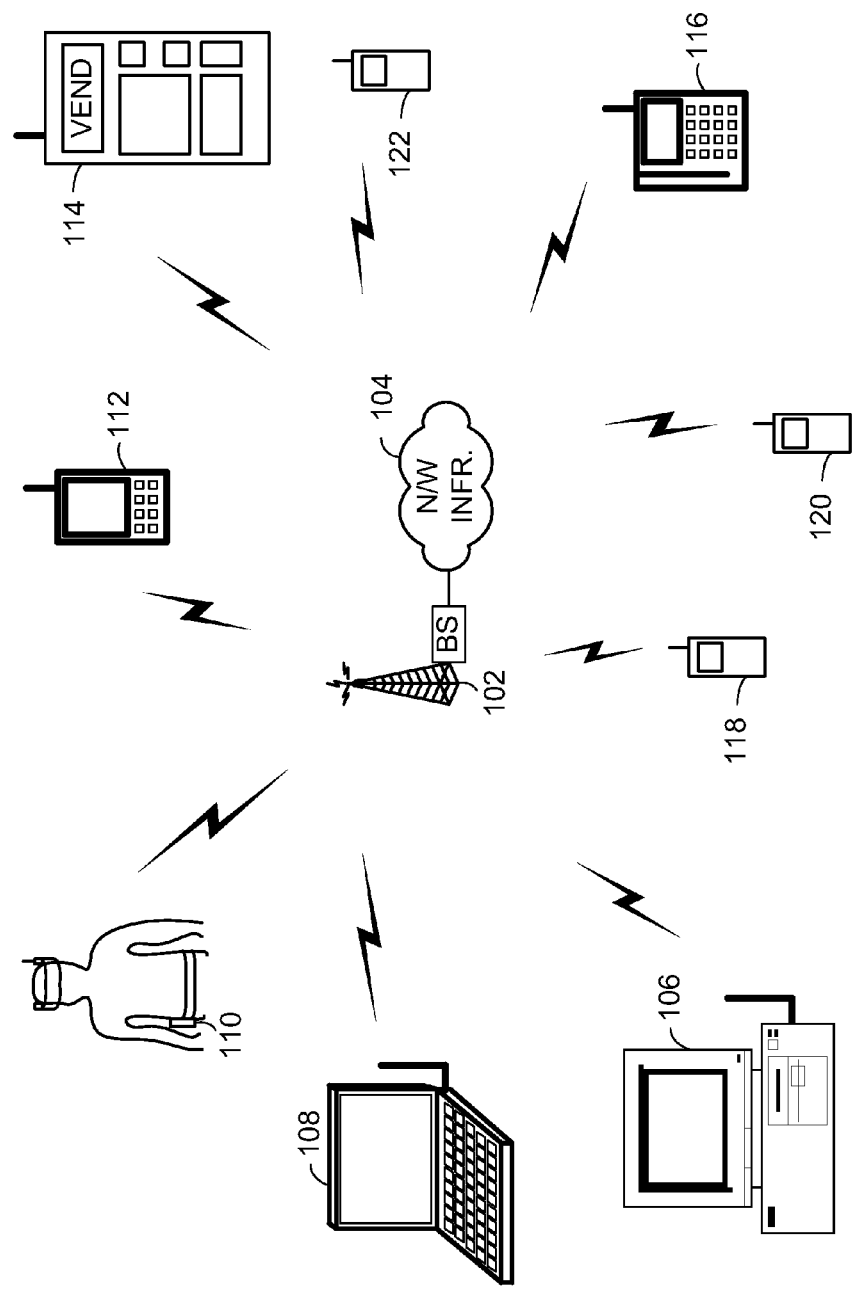
FIG. 1 is a system diagram illustrating a portion of a cellular wireless network constructed according to the present invention.

FIG. 1 is a system diagram illustrating a portion of a cellular system 100 that operates according to the present invention. The cellular system 100 infrastructure shown includes a base station 102 and a network infrastructure 104. These components are generally known and will be described only as they relate to the teachings of the present invention. The cellular system 100 may operate according to any various industry standard protocol (or proprietary protocol) that has been modified in accordance with the teachings of the present invention, e.g., various CDMA standards such as the IS-95B, IS-2000, 3GPP, W-CDMA, and other CDMA standards and various TDMA standards, e.g., IS-136, etc., among others.

The base station 102 provides wireless service within a corresponding geographic area (e.g., cell or sector(s)) and services a plurality of user terminals 106-122. Some of the user terminals (e.g., voice terminals 118, 120 and 122) service voice communications. Alternatively, other of the user terminals (e.g., desktop computer 106, laptop computer 108, wearable computer 110, data terminal 112, vending machine 114 and credit card terminal 116) service data communications. In servicing data communications, the base station 102 transmits packet data on the forward link to the user terminals 106-122. Further, the user terminals 106-122 transmit packet data to the base station 102 on the reverse link.

Operation according to the present invention provides efficient transmission of data bits using a procedure for adapting the data transmission rate or coding of data upon a transmission failure and thereby increasing the efficiency of packet data transmission. Typically, operation according to the present invention will be implemented upon the forward link. However, the principles of the present invention could be applied to reverse link transmissions as well. The present invention increases the efficiency of conventional packet data re-transmission by two possible approaches. First, the initial transmission packet (which is corrupted) is not discarded, but instead is combined together with the re-transmitted packet to further improve the signal to noise ratio. Second, the re-transmitted packet may be transmitted at a decreased coding rate to improve redundancy and thus error correction capability. In general these two approaches may be combined.

The present invention may be implemented, for example, according to three types of Automatic Repeat Request (ARQ) schemes. In the first scheme, the packet data transmission rate is reduced for each re-transmission, and the retransmitted packet is combined with part of the earlier transmitted packet. In the second scheme, the packet data rate is kept constant, and the retransmitted data packets are combined with earlier transmissions to reduce the rate of the resultant code. In the third scheme, the coding rate is incrementally decreased in combination with soft combining of self-decodable retransmissions. Of course, the present invention contemplates that the three schemes can be combined in different ways.

Figure 2:
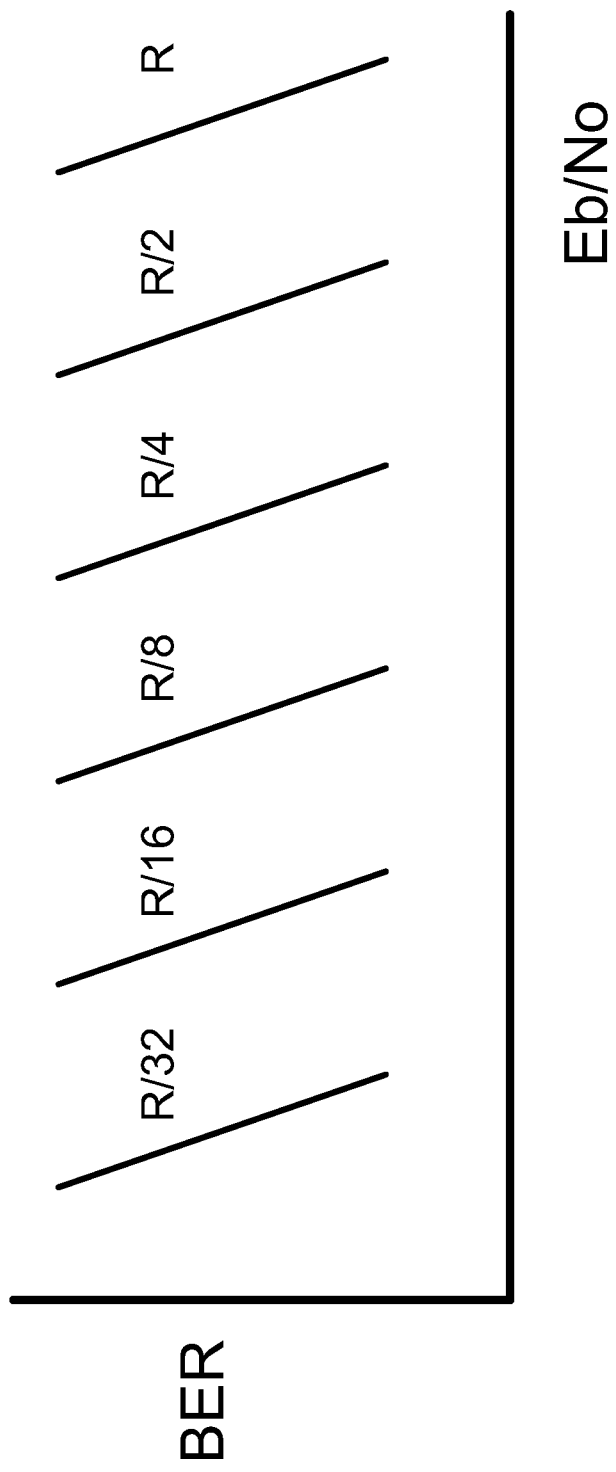
FIG. 2 is a graph illustrating the BER as a function of Eb/No for different data transmission rates.

FIG. 2 illustrates by way of example, the bit error rate (BER) of a data transmission as a function of the bit energy to noise power spectral density ratio (Eb/No) for various data transmission rates of a turbo coded transmission. In FIG. 2, the coding rate is fixed for different data transmission rates. As the data transmission rate increases, the Eb/No required to achieve a given BER becomes much larger. Therefore if a transmission fails due to a poor carrier interference ratio (C/I), a retransmission at a lower transmission rate will decrease the BER and increase the probability of a successful retransmission. For example, halving the transmission rate will double the signal to noise ratio, and thus improve the BER.

According to the present invention, the bits of a plurality of transmissions are combined. Retaining the bits of a transmission block of a first transmission and combining the transmission block of a first transmission with a transmission block of a retransmission also improves the signal to noise ratio of the combined result. In this fashion, by combining the bits of the first transmission and the bits of the retransmission, a weighted average of the soft estimates of the respective bits of the transmission blocks of the first transmission and the retransmission generates a combined transmission block. Decoding the combined transmission block yields a lower BER than decoding the individual transmission blocks. Particular embodiments of the present invention are described below.

Figure 3:
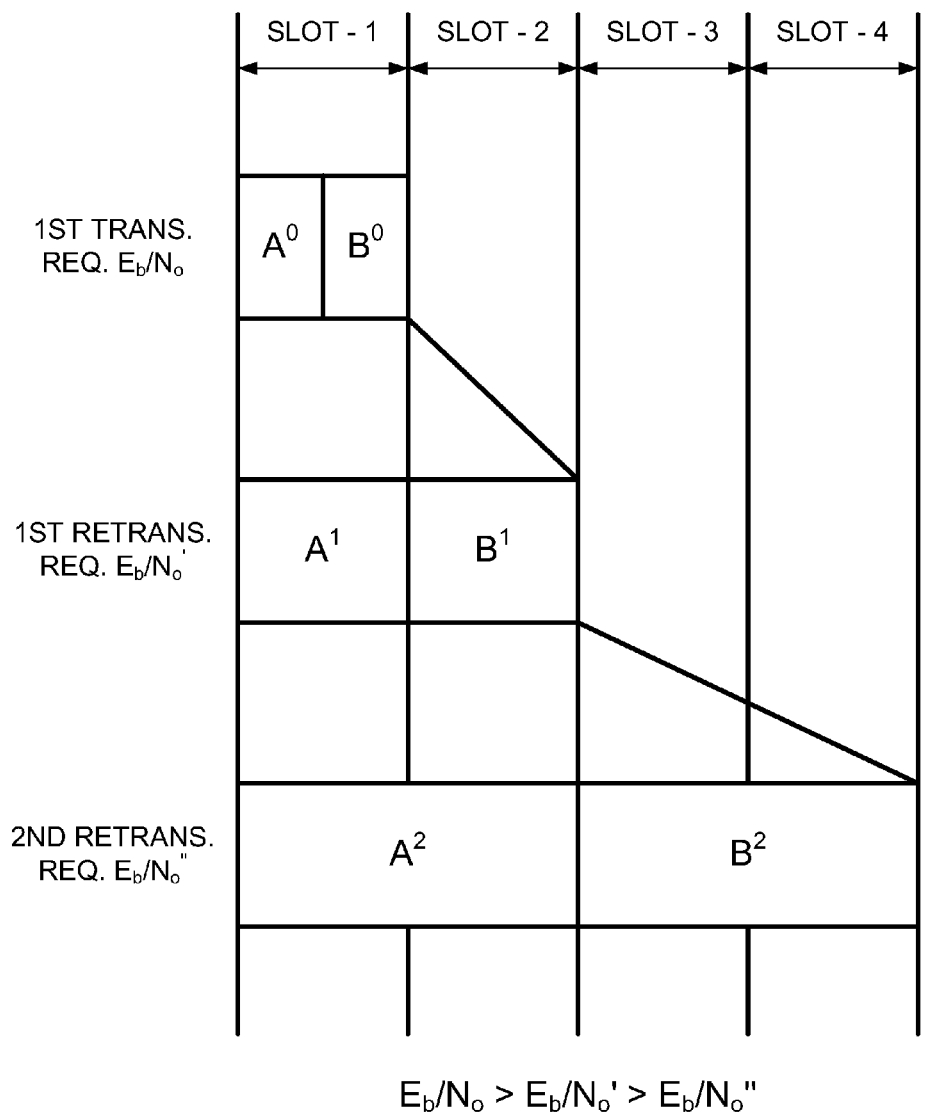
FIG. 3 illustrates data transmission rates of transmission and retransmissions of a data packet according to the first embodiment of the present invention.

FIG. 3 illustrates data transmission rates of transmission and retransmissions of a data packet according to the first embodiment of the present invention. According to the first embodiment, the data transmission rate is simply decreased for subsequent retransmissions of data and optionally a portion of the transmission block of the initial data packet is combined with that transmission block portion in later transmitted data packets. When turbo coding is employed, different Eb/No ratios are required to meet a certain BER for differing data rates. In general as noted in FIG. 3, the Eb/No required to achieve a certain BER will decrease with reduced rate retransmission.

In the first embodiment, the first transmission includes a first transmission block portion $A^0$, and also a second transmission block portion $B^0$, transmitted in a single transmission slot. The first and second transmission block portions together comprise the transmission block. In general, the transmission block may also include parity bits in addition to data bits. If the transmission fails, the data is retransmitted in a second transmission (first retransmission) at a rate of one-half the first transmission rate. Of course, the rate of first retransmission may also be other than one-half the first transmission rate, but should be less than the first transmission rate to decrease the BER and thus the probability of a successful retransmission.

As illustrated in FIG. 3, the second transmission could be transmitted over two transmission slots, with the first transmission block portion transmitted in the first transmission slot, and the second transmission block portion in a second slot. Thus, the second transmission comprises a first part, that is the first transmission block portion, and a second part, that is second transmission block portion. However, while the transmission of first transmission block portion $A^1$ and the second transmission block portion $B^1$ are shown to reside in adjacent slots, such would typically not be the case and these transmissions would be in non-adjacent slots.

The first transmissions and the second transmissions are combined using soft combining Soft combining may be accomplished in any of a variety of ways, some of which are known in the art. According to one soft combining technique, a quantified representation of one analog waveform is combined with another quantified representation of another analog waveform. Such soft combining must consider, however, the data rates of each of the analog waveforms and must compensate for any differences. Other soft combining techniques could also be employed with the other teachings of the present invention.

This embodiment introduces the notion of partial soft combining, where, based on the channel conditions, the full set of data or a partial set of data is retransmitted and combined before requesting the next portion of the second transmission. Partial soft combining introduces important benefits by, in some cases, enabling successful decoding without the requirement of full retransmission of data.

If the second transmission fails, the data transmission rate is again halved in a third transmission (second retransmission), and the first transmission block portion is transmitted over two transmission slots, while the second transmission block portion is also transmitted over two transmission slots as shown in FIG. 3. A first part of the third transmission extends over two slots and includes the first transmission block portion, while a second part of the third transmission also extends over two slots and includes the second transmission block portion. However, while the transmission of first transmission block portion $A^2$ and the second transmission block portion $B^2$ are shown to reside in adjacent slots, such would typically not be the case and this transmission would be in non-adjacent slots.

Figure 4:
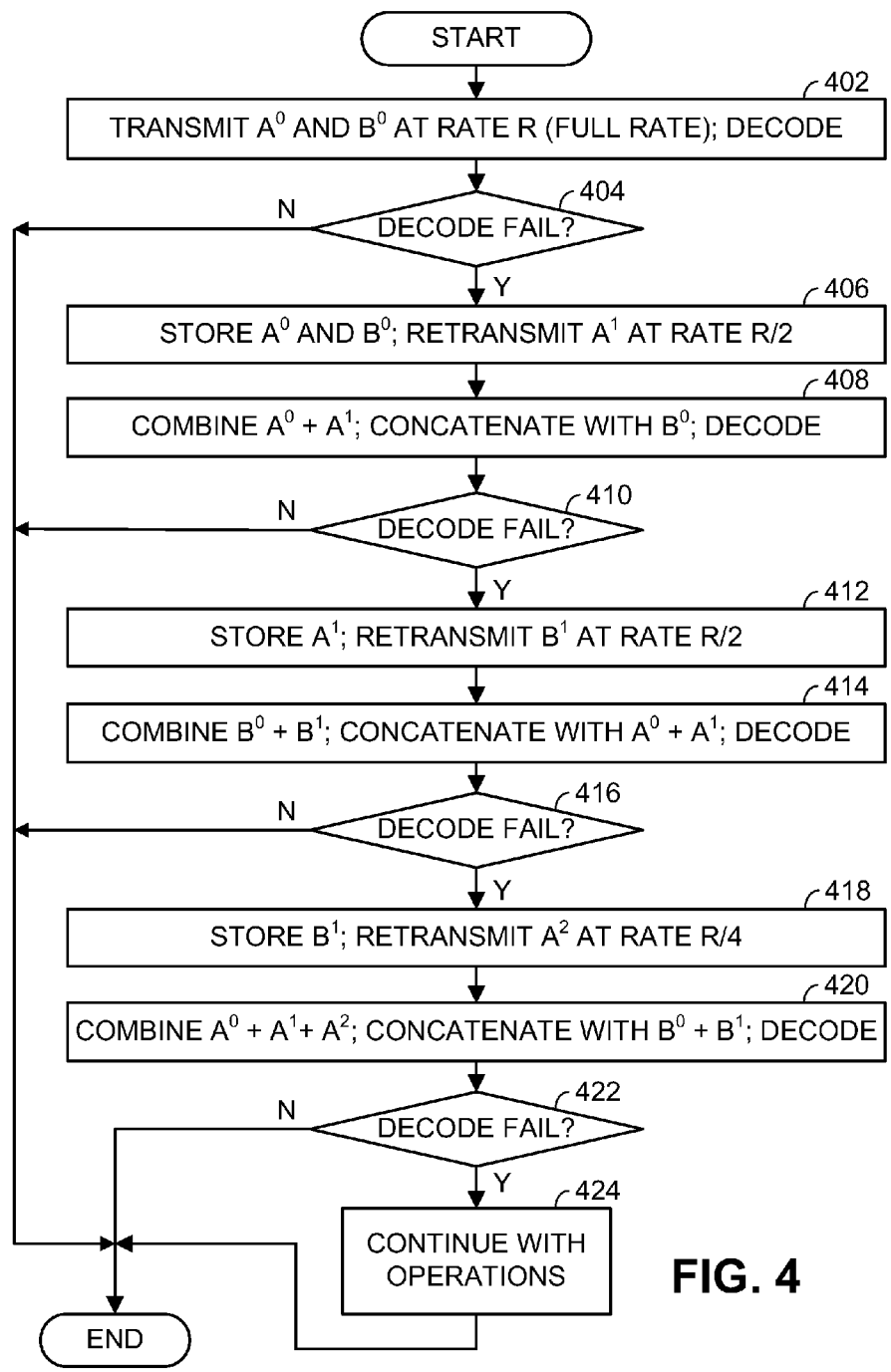
FIG. 4 is a flow diagram illustrating operation according to the first embodiment of the present invention.

FIG. 4 is a flow diagram illustrating operation according to the first embodiment of the present invention. The first transmission includes a first transmission block portion $A^0$ and a second transmission block portion $B^0$ which are transmitted from a transmitter to a receiver at a first data transmission rate. Generally, the transmission block portions will include, in addition to data bits, parity bits to increase redundancy and thus decoder error correction capability. In this regard, it is preferred that the data be first encoded before transmission, and then decoded after transmission, for example, through turbo coding/decoding.

For example, if turbo coding is employed, a data block comprising data bits for the first transmission block portion and the second transmission block portion is input into a turbo encoder. The output of the turbo encoder will generally include both the input data bits and parity bits. The output of the turbo encoder is then transmitted to a receiver including a turbo decoder as the transmission block. The output of the turbo encoder may be punctured prior to transmission to the receiver and turbo decoder. When the output of the turbo encoder is punctured, selected parity bits are not transmitted, and thus the transmission block will not include the punctured parity bits.

After the first transmission is received by the receiver (step 402), a decoder (a turbo decoder if turbo coding is used) will decode the first transmission block including $A^0$ and $B^0$ to provide decoded data bits in a first decoding. The receiver then determines if the first decoding was successful, i.e., whether the data block was successfully transmitted (step 404). If the first decoding was successful, no further transmission of the transmission block is necessary and operation for the transmission of the data block ends. However, if this first decoding was not successful, the receiver requests that the transmitter send the data again in a second transmission (first retransmission). The first transmission block is stored in the receiver when the first decoding fails (step 406).

The transmitter, upon receiving the request to resend the data, sends the first transmission block portion in the second transmission as $A^1$ (also at step 406). The data transmission rate of this second transmission is less than the data transmission rate of the first transmission and may be one half the rate of the first transmission.

The first transmission block portion of the first transmission, $A^0$, and the second transmission, $A^1$, are then soft combined to generate a first combination of the first transmission block portion $A^0+A^1$ (step 408). Soft combining is preferably used to combine $A^0+A^1$. Specifically, the receiver upon receiving a transmission of the transmission block or portion of a transmission block will generate a soft estimate for each of the bits of the transmission block or portion. In combining $A^0$ and $A^1$, the soft estimates of the respective bits of $A^0$ and $A^1$ are added in a weighted sum, and thus the first combination of the first transmission block portion is generated. The first combination of the first transmission block portion is concatenated with the second transmission block portion from the first transmission, and the resultant is decoded in a second decoding (also at step 408).

The receiver then determines if the second decoding was successful (step 410). If the second decoding was successful, no further transmission is necessary. However, if the second decoding was not successful, the receiver requests that the transmitter send the second transmission block portion in the second part of the second transmission. The second transmission of the first transmission block portion $A^1$ is stored in the receiver when the second decoding fails (step 412).

The transmitter, upon receiving the request to resend the data, now sends the second transmission block portion in the second part of the second transmission as $B^1$ (also at step 412). The data transmission rate of this second part of the second transmission is less than the data transmission rate of the first transmission and may be one half the rate of that transmission. $B^0$ and $B^1$ are soft combined, to form a first combination of the second transmission block portion, $B^0+B^1$. The combination, $A^0+A^1$, is then concatenated with the combination $B^0+B^1$ and the resultant is decoded in a third decoding (step 414).

The receiver then determines if the third decoding was successful (step 416). If the third decoding was successful, no further transmission of the data packet is necessary. However, if the third decoding was not successful, the receiver requests that the transmitter send data again in a third transmission (second retransmission). The second transmission block portion in the second part of the second transmission, $B^1$, is stored in the receiver when the third decoding fails (step 418).

The transmitter, upon receiving the request to resend the data, now sends the first transmission block portion in the third transmission as $A^2$ (also at step 418). The data transmission rate of this third transmission is less than the data transmission rate of the second transmission and may be one half the rate of the second transmission. The first transmission block portions, $A^0$, $A^1$, and $A^2$, of the transmissions are then soft combined to form a combination $A^0+A^1+A^2$. The combination $A^0+A^1+A^2$ is concatenated with the combination $B^0+B^1$ and the resultant decoded in a fourth decoding (step 420).

The receiver then determines if the fourth decoding was successful (step 422). If the fourth decoding was successful, no further transmission of the data packet is necessary. However, if the fourth decoding was not successful, the receiver may request that the transmitter send data again, and the method continues at decreasing data transmission rates, until the maximum number of allowed retransmissions is exceeded or the lowest data rate is reached (step 424). Once a successful decode has been obtained, or a determination to cease attempting successful receipt is made, operation ends.

This first embodiment is distinguishable from the conventional Type I Hybrid ARQ in that this embodiment is particularly applicable to variable rate channels, where the data rate is changed during retransmission (e.g., by changing the spreading factor). In such a channel, only a partial retransmission of the data is attempted if the retransmission data rate decreases with respect to the first transmission data rate, and may be adequate to recover the data. Alternately, if the channel improves from the first transmission to the first retransmission, further redundancy may be added to the code through repetition, or an additional data packet may be transmitted. A further difference is that soft combining of the partial transmitted data is utilized for decoding.

Figure 5:
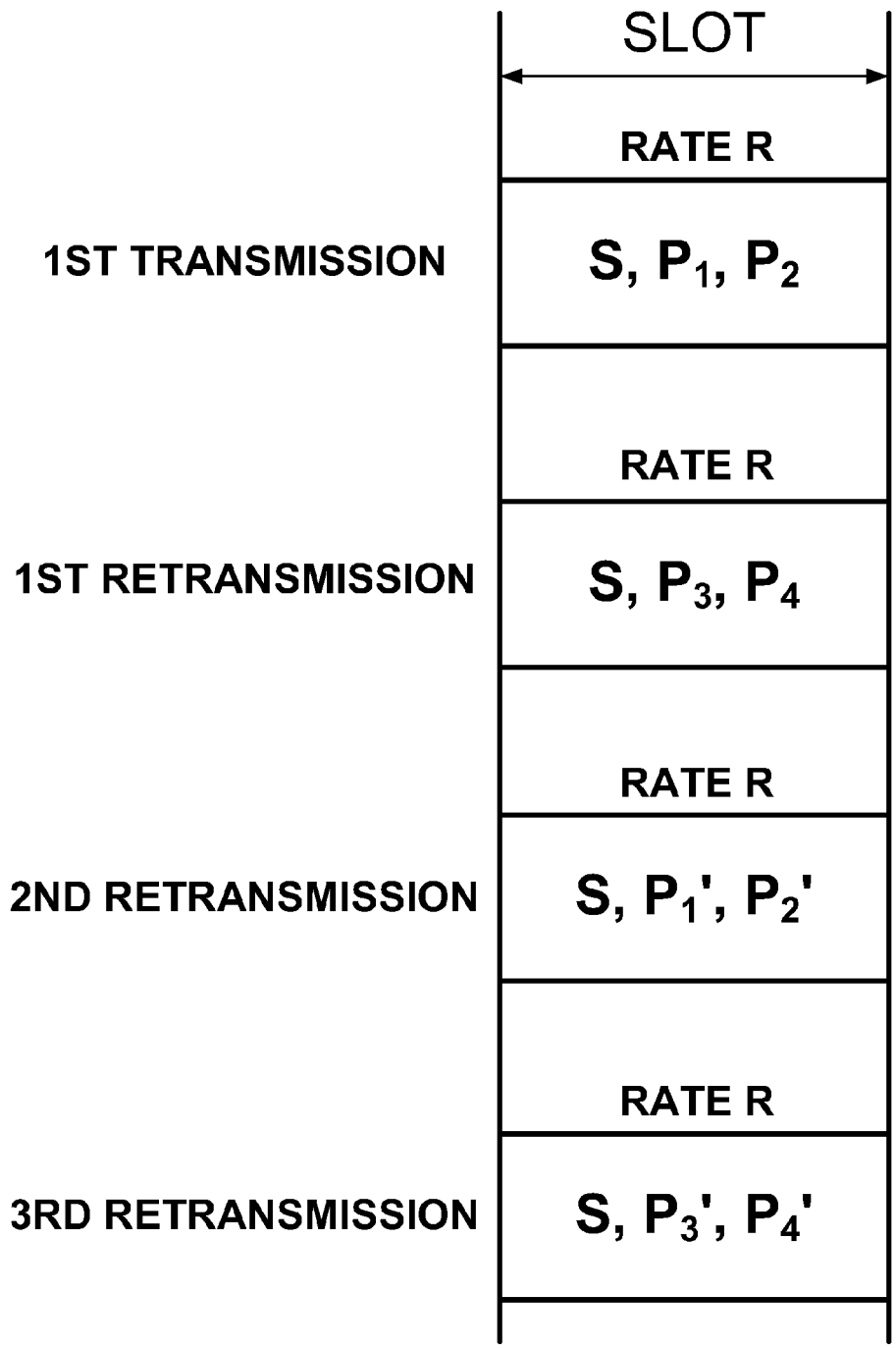
FIG. 5 illustrates transmissions and retransmissions of a data packet according to a second embodiment of the present invention.

FIG. 5 illustrates transmission and retransmissions of a data packet according to a second embodiment of the present invention. In the second embodiment, the data transmission and retransmission data rates remain fixed, and only the decoding rate of the combined transmission and retransmission changes. This may be accomplished, for example, by successively transmitting transmission blocks with alternate parity bits. In general, the coding rate of a transmission is the number of data bits transmitted divided by the total number of bits transmitted, where the total number of bits includes both data bits and parity bits.

In FIG. 5, the transmission block includes both data bits and parity bits, where S and $P_1$-$P_4$ represents data bits, and parity bits, respectively. An encoder, preferably a turbo encoder, generates the data bits and parity bits. The data bits S are the data bits in the transmission block to be transmitted. In the example of FIG. 5, for each data bit from the block of data to be transmitted there will be corresponding parity bits selected from the parity bits $P_1$-$P_4$.

The output of the turbo encoder, including both data bits S, and parity bits $P_1$-$P_4$ is then punctured, i.e., selected bits of the parity bits are not sent in the transmission. For the first transmission, for example as illustrated in FIG. 5, only parity bits $P_1$ and $P_2$ are transmitted with the data bits S. Thus all of the parity bits $P_3$ and $P_4$ are punctured in the first transmission. Of course, in other operations, some of the parity bits $P_1$ and $P_2$ may also be punctured, but some of these parity bits are also transmitted in this first transmission.

For example, in FIG. 5, the first transmission may be at a coding rate of one half. In this case, half of the parity bits $P_1$ and $P_2$ are punctured so that the number of data bits S transmitted is equal to the number of parity bits $P_1$ and $P_2$ transmitted. If the first transmission fails, the data is retransmitted in a retransmission (second transmission). However, in the second transmission, parity bits $P_1$ and $P_2$ are punctured so that only parity bits $P_3$ and $P_4$ are sent in the second transmission. Thus, in the second transmission, the parity bits transmitted include parity bits other than those sent in the first transmission. The transmission blocks of the first and second transmission are then soft combined to generate a resultant combination.

This resultant combination now includes all four parity bits, $P_1$-$P_4$, but since the resultant combination includes the same number of data bits, it has a lower rate code than the code of the individual transmissions. Because the redundancy introduced by the additional parity bits is what yields a code error correction capability, the lower code rate increases the error correction capability and thus increases the probability that a decoding of the resultant combination will be successful.

If the second transmission also fails, the data is again retransmitted in a third transmission (second retransmission). In the third transmission, the parity bits $P_1'$ and $P_2'$ are included. The parity bits $P_1'$ and $P_2'$ correspond to the parity bits $P_1$ and $P_2$, where the prime indicates a retransmission. Thus, the parity bits transmitted in the third transmission are the same as those of the first transmission. If the decoding after the third transmission fails, the data is again transmitted in a fourth transmission (third retransmission).

In the fourth transmission the parity bits $P_3'$ and $P_4'$ are included. The parity bits $P_3'$ and $P_4'$ correspond to the parity bits $P_3$ and $P_4$, where the prime indicates a retransmission. If the decoding after the fourth transmission fails, the process of retransmission continues.

Figure 6:
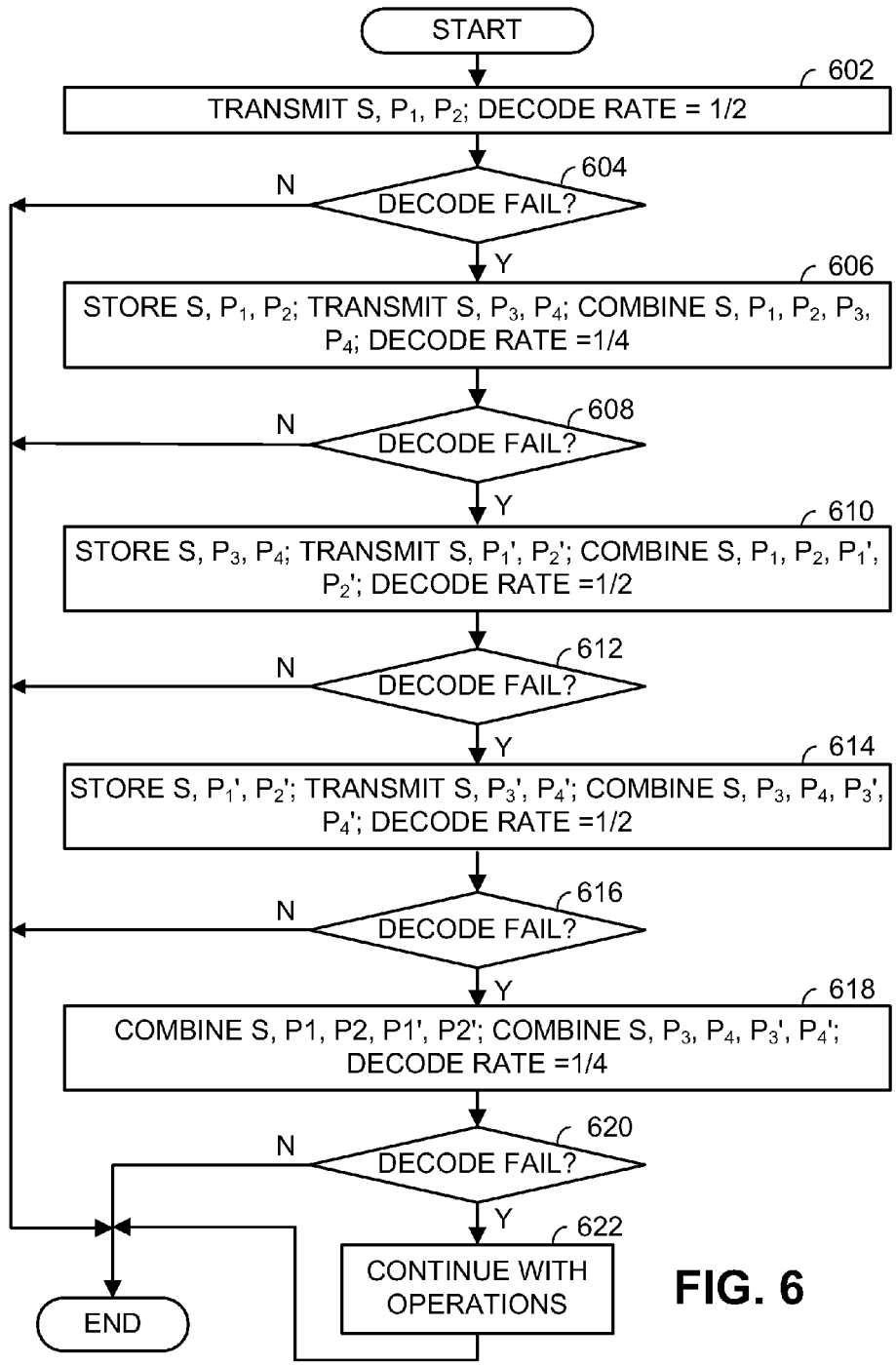
FIG. 6 is a flow diagram illustrating operation according to the second embodiment of the present invention.

FIG. 6 is a flow diagram illustrating in further detail operation according to the second embodiment of the present invention. The example illustrated in FIG. 6 uses, for example, 8-state PCCC (parallel concatenated convolutional coding) turbo code. Prior to the first transmission, data bits S are input into a turbo encoder, the turbo encoder encodes the set of data bits S and generates an output including the data bits S and parity bits $P_1$-$P_4$. The encoder output is then punctured to remove selected parity bits. Specifically, as shown in FIG. 6, all the parity bits $P_3$ and $P_4$ are punctured. Further, some of the parity bits $P_1$ and $P_2$ are also punctured. Since the coding rate of the first transmission is one half, half of the parity bits $P_1$ and $P_2$ are punctured so that there are an equal number of parity bits and data bits. Of course if an initial coding different than one half is desired, a different fraction of parity bits may be appropriately punctured.

After puncturing the output from the turbo encoder, the transmitter transmits the punctured output in a first transmission as a transmission block (step 602). The receiver than decodes the first transmission providing a first set of decoded data bits in a first decoding at a first decoding rate. The receiver than determines if the first decoding, and thus the first transmission was successful (step 604). If the first decoding was successful no further transmission of the data packet is necessary. However, if the first decoding is not successful, the first transmission, including data bits and parity bits is stored, and the receiver requests that the transmitter retransmit the data in a second transmission (first retransmission, at step 606).

The transmitter upon receiving the request to retransmit the data, transmits the set of data bits S in the second transmission. Also included in this second transmission are parity bits $P_3$ and $P_4$. In this second transmission, all of the parity bits $P_1$ and $P_2$ are punctured, while none of the parity bits $P_3$ and $P_4$ are punctured. Thus, the first and second transmissions are the same except that the parity bits $P_3$ and $P_4$ are transmitted instead of the parity bits $P_1$ and $P_2$. The second transmission is then combined with the first transmission to provide a first combined transmission (also at step 606). The first and second transmissions are combined by a soft combining method. The soft combining reduces the signal to noise of the combination relative to the individual transmissions.

The resultant first combined transmission of this first combining will have the same number of data bits, but an increased number of parity bits. Thus, the redundancy of the first combined transmission is greater than that of either the first or second transmission. The first combined transmission is then decoded (also at step 606). Because of the increased redundancy of the combined transmission, the rate of the combined code is beneficially greater. The receiver then determines if the decoding is successful (step 608). If successful, no further retransmissions are necessary.

Optionally, the second transmission may be decoded prior to combining the first and second transmissions, and the success of this decoding is then determined. This is possible because the second transmission (and further retransmissions) are self decodable and thus need not be combined with other transmissions to be decoded.

However if the decodings are not successful, the second transmission, including data bits and parity bits is stored, and the receiver requests that the transmitter retransmit the data in a third transmission (second retransmission, at step 610). The transmitter upon receiving the request to retransmit the data transmits the set of data bits S in the third transmission (also at step 610). Also included in this third transmission are parity bits $P_1'$ and $P_2'$. The parity bits $P_1'$ and $P_2'$ correspond to the parity bits $P_1$ and $P_2$, where the prime indicates a retransmission. The coding rates for the first and third transmissions may be the same. The third transmission is then combined with the first transmission to provide a second combined transmission (also at step 610).

The first and third transmissions are combined, preferably, by a soft combining method. Because parity bits $P_1'$ and $P_2'$ correspond to the parity bits $P_1$ and $P_2$, respectively, the second combined transmission will have the same number of parity bits as for the individual first and third transmissions. Thus, the redundancy of the second combined transmission will be less than for the first combined transmission, which included all four parity bits $P_1$-$P_4$. However, the signal to noise of the resultant combination will still be decreased relative to the individual transmissions. Additionally, the stored parity bits $P_3$ and $P_4$ can also be soft combined to improve performance.

The combined first and third transmissions are then decoded, and the receiver determines if the decoding is successful (step 612). Optionally, the third transmission may be decoded prior to combining the first and third transmissions, and the success of this decoding is then determined. If the decodings are not successful, the third transmission, including data bits and parity bits is stored, and the receiver requests that the transmitter retransmit the data in a fourth transmission (third retransmission at step 614).

The transmitter upon receiving the request to retransmit the data transmits the set of data bits S in the fourth transmission. Also included in this fourth transmission are parity bits $P_3'$ and $P_4'$. Thus, all of the parity bits $P_1$ and $P_2$ are punctured. The coding rates for the fourth and second transmissions may be the same. The fourth transmission is then combined with the second transmission to provide a third combined transmission (also at step 614). The second and fourth transmissions are combined, preferably, by a soft combining method. Because parity bits $P_3'$ and $P_4'$ correspond to the parity bits $P_3$ and $P_4$, respectively, the third combined transmission will have the same number of parity bits as for the individual second and fourth transmissions. Thus, the redundancy of the third combined transmission will be less than for the first combined transmission, which included all four parity bits $P_1$-$P_4$. However, the signal to noise of the resultant combination will still be decreased relative to the individual transmissions.

The combined second and fourth transmissions are then decoded, and the receiver determines if the decoding is successful (step 616). Optionally, the fourth transmission may be decoded prior to combining the second and fourth transmissions, and the success of this decoding is then determined. If the decoding is successful, no further retransmissions are necessary. However, if the decodings are not successful, the first, second, third and fourth transmissions are all combined, preferably, by a soft combining method to generate a fourth combined transmission (also at step 618). The resultant fourth combined transmission will have the same number of information bits, but an increased number of parity bits relative to the individual transmissions. Thus, the redundancy of the fourth combined transmission is greater than that of any of the individual transmissions.

The fourth combined transmission is then decoded. Because of the increased redundancy of the combined transmission, the rate of the combined code is beneficially greater. Moreover, the signal to noise is also further reduced due to the combining of the same parity bits and data bits in the different transmissions. The receiver then determines if the decoding is successful (step 620). If successful, no further retransmissions are necessary. Otherwise, the retransmission process may continue (step 622). Upon a successful decoding process, or when no more attempts are made, operation ends.

Figure 7:
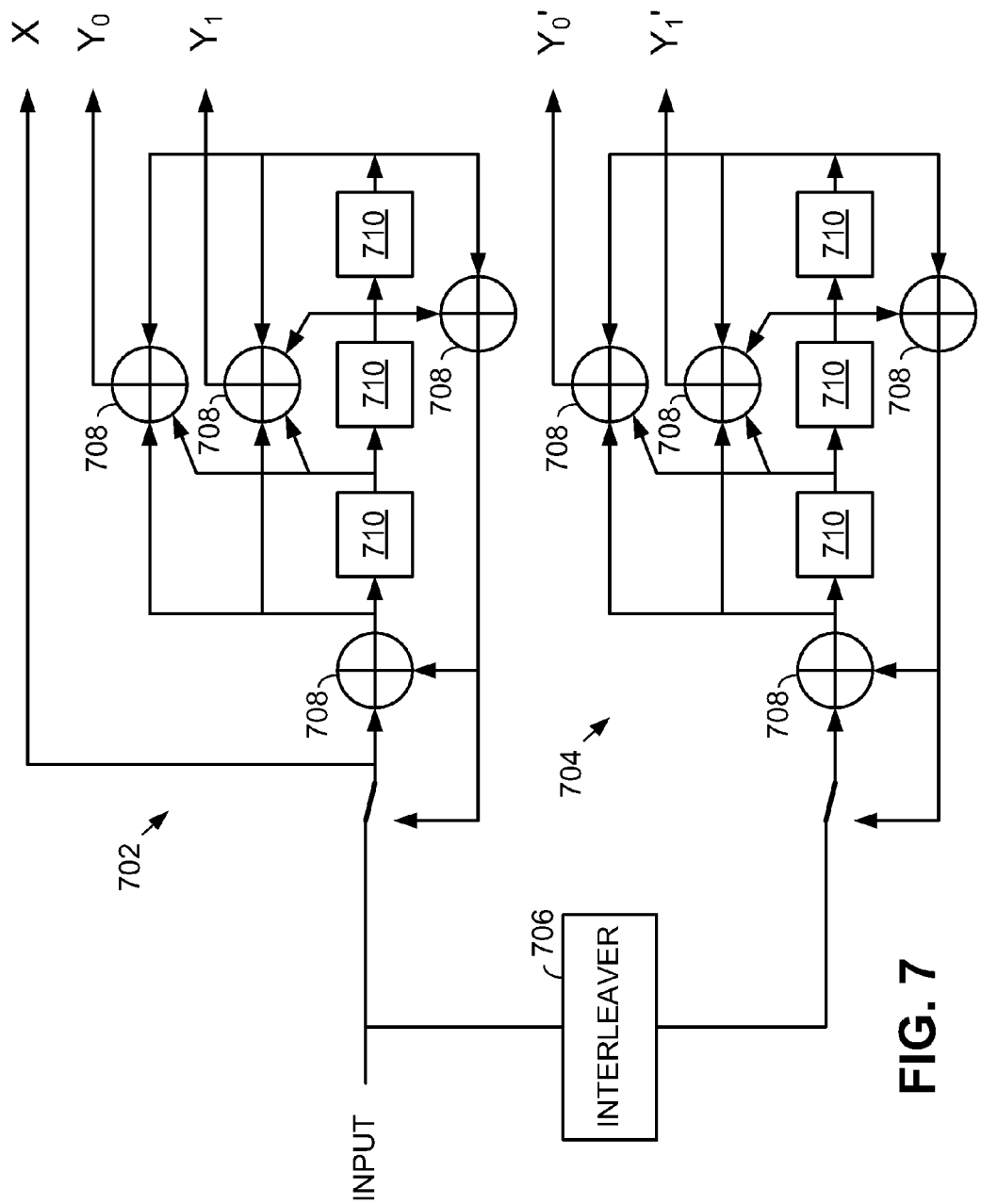
FIG. 7 is a schematic diagram illustrating a turbo encoder for use with the second and third embodiments of the present invention.

FIG. 7 is a schematic showing a turbo encoder according to this second embodiment of this invention. Specifically, FIG. 7 shows a first encoder 702 to which a data block (INPUT) is provided and the output is data bits X and parity bits $Y_0$ and $Y_1$. The turbo encoder of FIG. 7 also includes a second encoder 704 shown below the first encoder, the data bits of the data block are interleaved in an interleaver 706 prior to being input into the second encoder. The interleaver 706 interleaves, or permutes, the data bits input according a permutation algorithm as is known in the art. The second encoder 704 outputs the parity bits $Y_0'$ and $Y_1'$.

The encoders 702 and 704 each include a plurality of binary adders 708. Each binary adder 708 adds the bits input into the binary adder 708 and outputs the result of the addition. The encoders 702 and 704 of FIG. 7 also include a plurality of one bit delay lines 710.

FIG. 8 is a puncturing table that illustrates an exemplary puncturing procedure for use with the second embodiment of this invention. In the table, X refers to the data bits output from the turbo encoder of FIG. 7, while $Y_0$, $Y_1$, $Y_0'$, and $Y_1'$ refer to parity bit output of that encoder. The successive binary numbers listed in the table represent the puncturing for successive bits output from the encoder, where 1 indicates no puncturing and 0 indicates puncturing. For example, the successive binary numbers 1, 1 in the row labeled X indicate no puncturing for two successive data bits output from the encoder.

As can be seen from the table of FIG. 8, the data bits are not punctured. In other words, all of the data bits that are output from the encoder are transmitted in each of the transmissions. However, as can also be seen, many of the parity bits are punctured. For example, in the first transmission, the 1, 0 for the parity bit $Y_0$ indicates that every other (the odd numbered ones) $Y_0$ parity bit output is punctured, while the 0, 0 for the $Y_1$ parity bits indicates that all the $Y_1$ parity bits are punctured for the first transmission. The 0, 1 for the parity bits $Y_0'$ indicates that every other (the even numbered ones) $Y_0'$ parity bit is punctured.

Further, the puncture table of FIG. 8 also illustrates the coding rate for the first transmission and the subsequent retransmission. For example, for the first transmission for every two unpunctured data bits, the number of unpunctured parity bits is also two, and the coding rate will be one half. As can be seen the coding rate of the individual transmissions remains the same at a rate of one half. Of course the invention is not limited to transmissions at a coding rate of one half and may have other coding rates.

Although the coding rate of the individual transmissions in FIG. 8 remain the same, the rate of the code of the combination of successive transmissions is less, and thus the redundancy is increased for the combination of successive transmissions. Specifically, although the coding rate of the individual transmissions will be one half according to the example puncturing table of FIG. 8, the rate of the code of the combination of successive transmissions is one fourth because the two information bits are transmitted and eight bits transmitted overall.

Thus, the exemplary puncturing table of FIG. 8 provides a beneficial increase in redundancy when successive transmissions are combined. This second embodiment is distinguishable from the Type II Hybrid ARQ at least in that the method is adapted to a variable rate channel, and whenever possible, data is transmitted along with the parity bits in each retransmission. Specifically, the selection and transmission of parity bits for turbo codes is considered in this embodiment and an exemplary puncturing code is provided for the turbo code.

Figure 9:
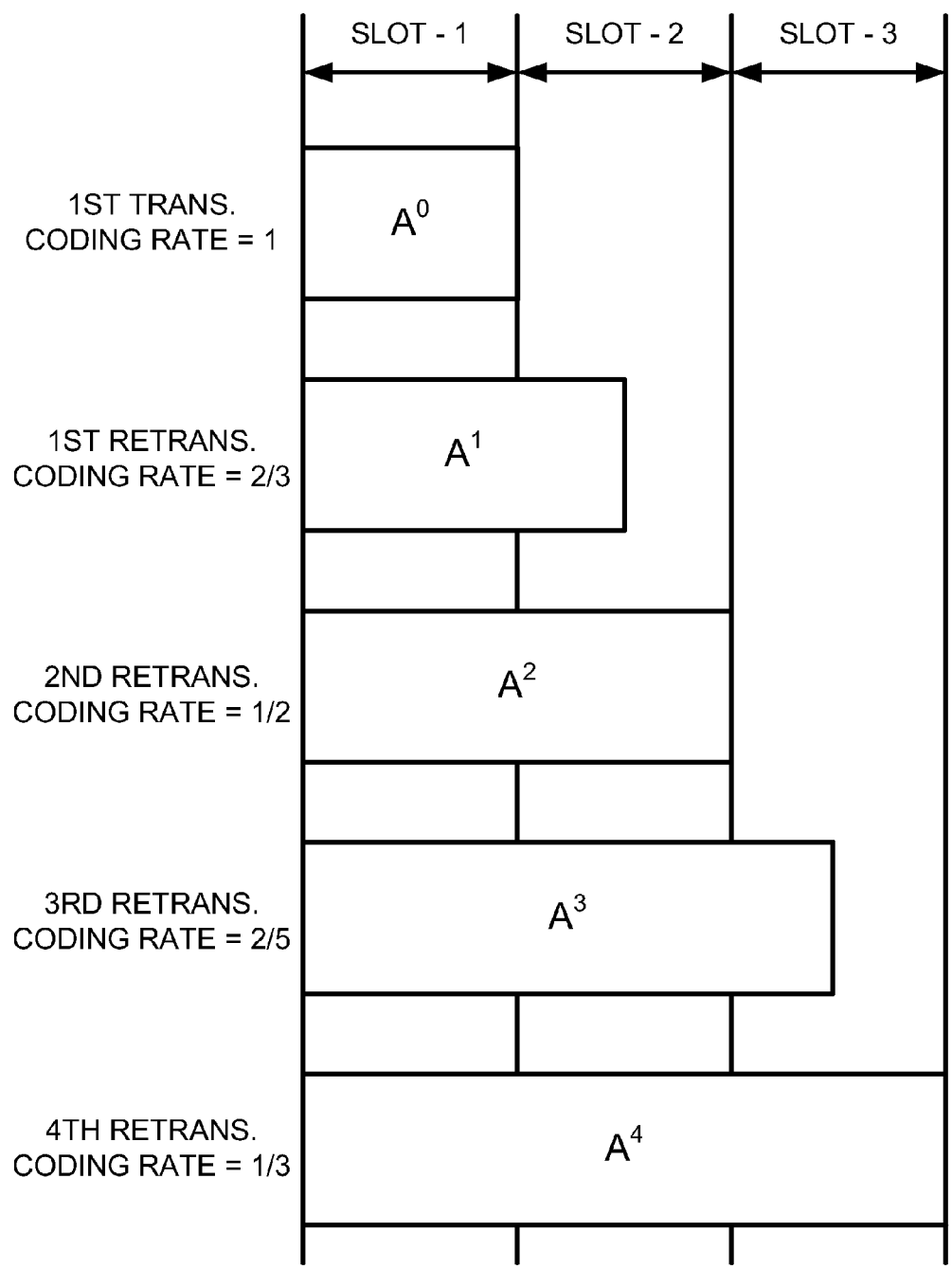
FIG. 9 illustrates transmissions and retransmission of a data packet according to a third embodiment of the present invention.

FIG. 9 illustrates transmission rates of transmission and retransmission of a data packet according to a third embodiment of the present invention. In this third embodiment the data transmission may be changed for each of the retransmissions. Furthermore, the coding rate changes in an incremental fashion. In FIG. 9 the first transmission of a transmission block is shown, for example, having a coding rate of 1, i.e., no parity bits are transmitted. If the decoding of the first transmission $A^0$ is not successful, the transmission block is retransmitted in a first retransmission $A^1$ (second transmission). The second transmission coding rate is incrementally smaller than the first transmission, and is, for example, two thirds. As with prior embodiments the individual transmissions may be combined to increase the signal to noise ratio, and the combination decoded.

Alternatively, or optionally, each individual transmission may be decoded prior to combining transmissions. Thus, this invention has the flexibility of self decodable retransmissions. If the decodings of the transmissions fail, the data is retransmitted in ever decreasing coding rates to progressively increase redundancy. FIG. 9 illustrates, for example, that the first transmission through the fourth retransmission (first through fifth transmission), have respective decoding rates of one, two thirds, one half, two fifths and one third, respectively. The coding rate is decreased through puncturing the output from an encoder prior to transmission.

In FIG. 9, the number of bits transmitted increases with decreases in coding rate, and thus the transmissions require an increasingly larger number of slots to be transmitted. For example, FIG. 9 shows that the first through fifth transmission are transmitted respectively over 1, 1.5, 2, 2.5, and 3 time slots.

Figure 10:
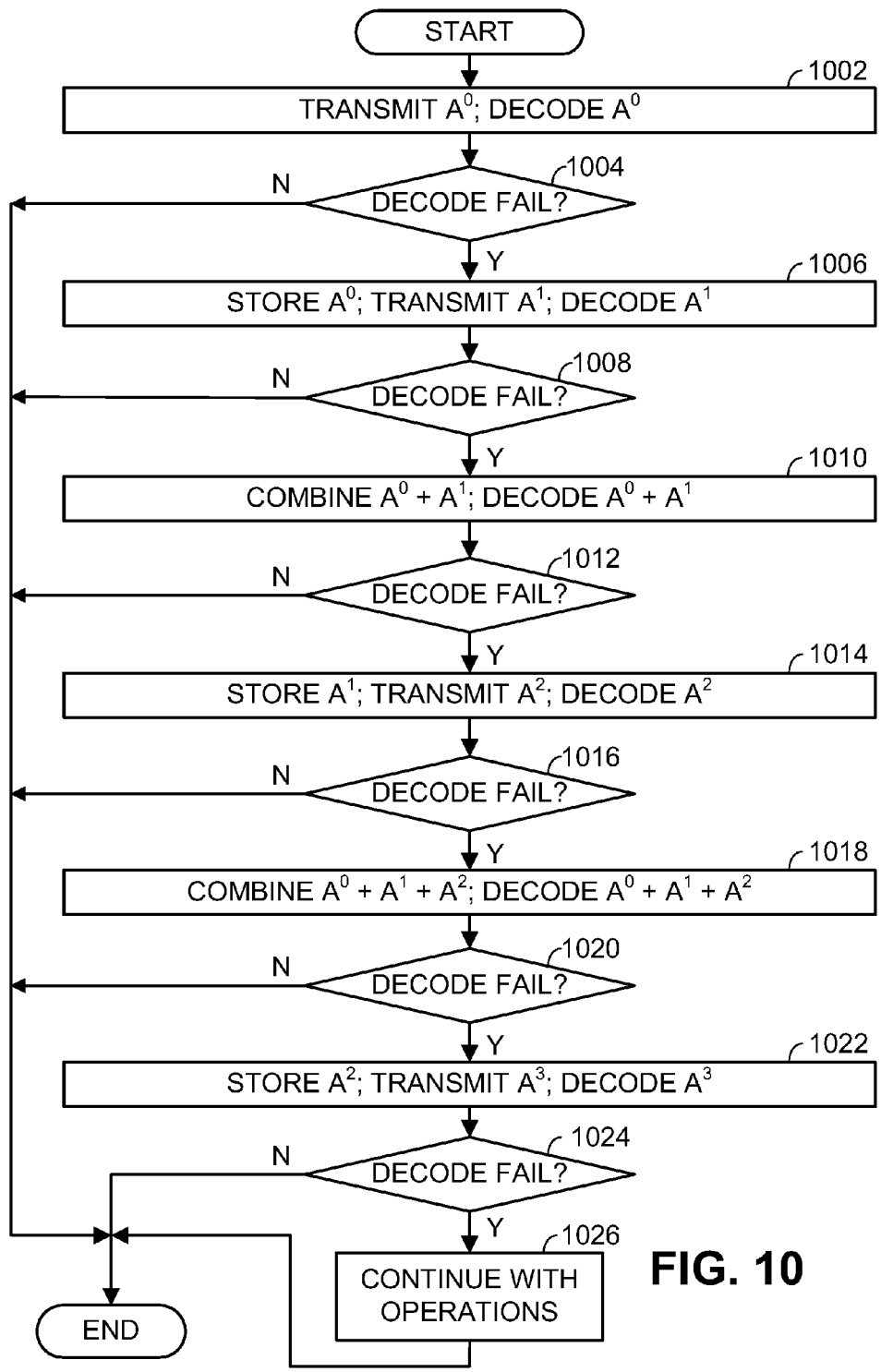
FIG. 10 is a flow diagram further illustrating operation according to the third embodiment of the present invention.

FIG. 10 is a flow diagram further illustrating a method according to the third embodiment of the present invention. The example illustrated in FIG. 10 uses, for example, 8-state PCCC turbo code to encode data blocks prior to transmission. The data blocks are input into a turbo encoder which outputs the data bits and parity bits according to the turbo code. For example, a turbo encoder such as the one shown in FIG. 7 may be used. The turbo encoder output is then punctured, and the coding rate is set according to the particular puncturing scheme employed. For example, the initial coding rate may be set to one, and all parity bits are punctured.

The punctured output is sent in a transmission block in the first transmission $A^0$ (step 1002). The receiver then soft estimates the bits of the transmitted transmission block and feeds the soft estimates into a decoder to decode the first transmission providing decoded data bits in a first decoding (also at step 1002). The receiver then determines if the first decoding was successful (step 1004). If the first decoding was successful no further transmission of the data packet is necessary.

However, if the first decoding is not successful, the first transmission $A^0$, including data bits and parity bits, if any, is stored, and the receiver requests that the transmitter retransmit the data in a second transmission (first retransmission, step 1006). The transmitter upon receiving the request to retransmit the data, transmits a transmission block in the second transmission $A^1$. The second transmission is transmitted at a lower coding rate than the first transmission thereby increasing redundancy. In this second transmission the coding rate is reduced to two thirds, for example. Of course, the coding rate in the second transmission need not be two thirds, but is lower than the coding rate in the first transmission to increase redundancy. Increasing the number of parity bits that are transmitted decreases the coding rate. This increased number of parity bits transmitted increases the redundancy and thus improves the codes' error correction capability.

The second transmission $A_1$ is then decoded in a second decoding (also at step 1006) and the receiver determines whether the decoding was successful (step 1008). If the receiver determines that the second decoding, and thus the second transmission, is successful no further retransmissions are necessary. If the receiver determines that the second decoding is not successful, the second transmission $A^1$ is combined with the stored first transmission $A^0$ to form a first combined transmission, $A^0+A^1$, preferably, by a soft combining method (step 1010). The first combined transmission is then decoded (also at step 1010) and the receiver determines if the decoding is successful (step 1012). If decoding is successful, no further retransmissions are necessary. Alternatively, the first combined transmission may be decoded prior to the second transmission, and the success of this decoding is then determined. If both decodings are not successful, the second transmission, including data bits and parity bits is stored, and the receiver requests that the transmitter retransmit the data in a third transmission (second retransmission, at step 1014).

The transmitter upon receiving the request to retransmit the data, transmits a transmission block in the third transmission (second retransmission) $A^2$. The third transmission is transmitted at a yet lower coding rate than the second transmission, again increasing the redundancy. For example, if the coding rate of the second transmission is two thirds, the coding rate of the third transmission may be reduced to one half.

The third transmission $A^2$ is then decoded (also at step 1014) and the receiver determines whether the decoding is successful (step 1016). If the receiver determines that this decoding is successful, no further retransmissions are necessary. If the receiver determines that this decoding is not successful, the third transmission $A^2$ may be combined with both the stored first transmission $A^0$ and second transmission $A^1$ to form a second combined transmission, $A^0+A^1+A^2$ (step 1018). This combination, $A^0+A^1+A^2$, is generated, preferably, by a soft combining method. The second combined transmission is then decoded (also at step 1018), and the receiver determines if the decoding is successful (at step 1020). If successful, no further retransmissions are necessary. Alternatively, the second combined transmission may be decoded prior to the third transmission, and the success of this decoding is then determined.

If both decodings are not successful, the third transmission, including data bits and parity bits is stored, and the receiver requests that the transmitter retransmit the data in a fourth transmission (third retransmission, at step 1022). The transmitter upon receiving the request to retransmit the data, transmits a transmission block in the fourth transmission (third retransmission, also at step 1022) $A^3$. The fourth transmission is transmitted at a yet lower coding rate than the third transmission. For example, if the coding rate of the third transmission is one half, the coding rate of the fourth transmission may be reduced to two fifths.

The fourth transmission $A^3$ is then decoded (also at step 1022). The receiver then decodes the transmission (step 1024). If the receiver determines that this decoding, and thus the fourth transmission, is successful no further retransmissions are necessary. If the receiver determines that this decoding is not successful, the fourth transmission $A^3$ may be combined with one or more of the earlier stored transmissions $A^0+A^1+A^2$, to form a third combined transmission.

The third combined transmission is then decoded, and the receiver determines if the decoding is successful. If successful, no further retransmissions are necessary. If both the decoding of $A^3$ and of the third combination transmission are not successful, the fourth transmission, including data bits and parity bits is stored, and the receiver requests that the transmitter retransmit the data in a further transmission, and the process continues accordingly (at step 1026) until a successful decode is made or until the transmission is abandoned.

FIG. 11 is a puncturing table that illustrates an exemplary puncturing procedure for use in the third embodiment of this invention. In the puncturing table of FIG. 11, X refers to the data bits output from the turbo encoder of FIG. 7, while $Y_0$, $Y_1$, $Y_0'$, and $Y_1'$ refer to parity bit output of that encoder. The successive binary numbers listed in the table represent the puncturing for successive bits output from the encoder, where 1 indicates no puncturing and 0 indicates puncturing. For example, the successive binary numbers 1, 1, 1, 1 in the row labeled X indicate no puncturing for four successive data bits output from the encoder.

As can be seen from the table of FIG. 11, the data bits are not punctured. In other words, all of the data bits output from the encoder are transmitted in each of the transmissions. However, as also can be seen, many of the parity bits are punctured. For example, in the first transmission all of the parity bits have 0, 0, 0, 0 puncturing indicating that all of the parity bits are punctured and none are transmitted.

In the second transmission (first retransmission), the 0, 0, 1, 0 for the parity bits $Y_1$ and $Y_1'$ indicates that the third out of every four of these parity bits is punctured. In this second transmission the 0, 0, 0, 0 for the parity bits $Y_0$ and $Y_0'$ indicates that all of these parity bits are punctured. The puncture table of FIG. 11 also illustrates the coding rate for the first transmission and the subsequent retransmissions. For example, for the first transmission, for every four unpunctured data bits, the number of unpunctured parity pits is zero, and the coding rate will be one. However, for the first retransmission there are two unpunctured parity bits for every four unpunctured data bits and the coding rate is thus two thirds.

The puncturing table of FIG. 11 illustrates that the coding rate of the transmissions incrementally decreases from an initial coding rate of 1 (no redundancy) to a coding rate of one third. Of course the coding rates illustrated are merely exemplary and other incrementally decreasing coding rates may be used.

This third embodiment is distinguishable from the Type III Hybrid ARQ at least in the punctured turbo codes used for forward error correction, the code rate is progressively decreased to that of the mother code, and the extension to a variable rate channel. In the latter, if the retransmission rate is lower than the prior transmission, then none, some, or all of the data bits may be included based on the retransmission rate available.

The first three embodiments may also be combined. For example, the example of the second embodiment described above describes alternate parity bit transmission for successive transmissions at a fixed data transmission rate and coding rate for the individual transmissions, while the example of the third embodiment described above describes an incremental decrease in the coding rate of individual transmissions. These embodiments could be combined to provide alternate parity bit transmission and an incremental decrease in the coding rate of individual transmissions. Further generalizations combining the data transmission rate and the coding rate are also possible. In the event that the data can be transmitted over a smaller number of slots with this combination, the remaining slots may be used to transmit new information.

A further embodiment of this invention generalizes the methods proposed above to deliver adaptive coding through employing both the variable data rate option mentioned in the first embodiment above and the variable coding rate option mentioned in the subsequent embodiments to generate an arbitrary rate code. An extension of this embodiment will yield significant efficiency in that an increased transmission data rate due to improved channel conditions will allow a variety of options, e.g., introduction of further redundancy by repetition, or multiplexing of the retransmission data with new data to the user(s).

Figure 12:
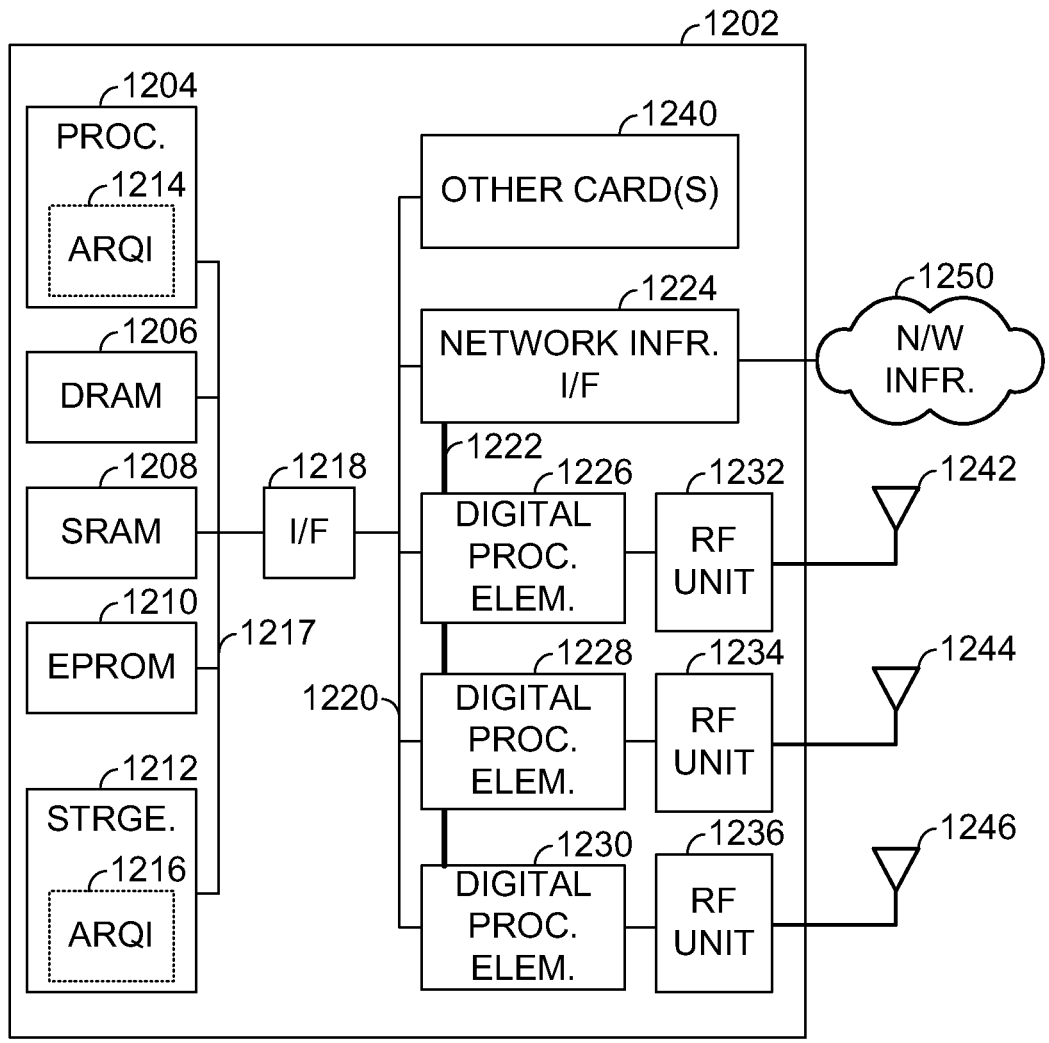
FIG. 12 is a block diagram illustrating a base station constructed according to the present invention.

FIG. 12 is a block diagram illustrating a base station 1202 constructed according to the present invention that performs the operations previously described herein. The base station 1202 supports a CDMA operating protocol, e.g., IS-95A, IS-95B, IS-2000, and/or various 3G and 4G standards. However, in other embodiments, the base station 1202 supports other operating standards.

The base station 1202 includes a processor 1204, dynamic RAM 1206, static RAM 1208, Flash memory, EPROM 1210 and at least one data storage device 1212, such as a hard drive, optical drive, tape drive, etc. These components (which may be contained on a peripheral processing card or module) intercouple via a local bus 1217 and couple to a peripheral bus 1220 (which may be a back plane) via an interface 1218. Various peripheral cards couple to the peripheral bus 1220. These peripheral cards include a network infrastructure interface card 1224, which couples the base station 1202 to the wireless network infrastructure 1250. Digital processing cards 1226, 1228, and 1230 couple to Radio Frequency (RF) units 1232, 1234, and 1236, respectively. The RF units 1232, 1234, and 1236 couple to antennas 1242, 1244, and 1246, respectively, and support wireless communication between the base station 1202 and user terminals (shown in FIG. 13). The base station 1202 may include other cards 1240 as well.

Automatic Retransmission Request Software Instructions (ARQI) 1216 are stored in storage 1212. The ARQI 1216 are downloaded to the processor 1204 and/or the DRAM 1206 as ARQI 1214 for execution by the processor 1204. While the ARQI 1216 are shown to reside within storage 1212 contained in base station 1202, the ARQI 1216 may be loaded onto portable media such as magnetic media, optical media, or electronic media. Further, the ARQI 1216 may be electronically transmitted from one computer to another across a data communication path. These embodiments of the ARQI are all within the spirit and scope of the present invention. Upon execution of the ARQI 1214, the base station 1202 performs operations according to the present invention previously described herein.

The ARQI 1216 may also be partially executed by the digital processing cards 1226, 1228, and 1230 and/or other components of the base station 1202. Further, the structure of the base station 1202 illustrated is only one of many varied base station structures that could be operated according to the teachings of the present invention.

Figure 13:
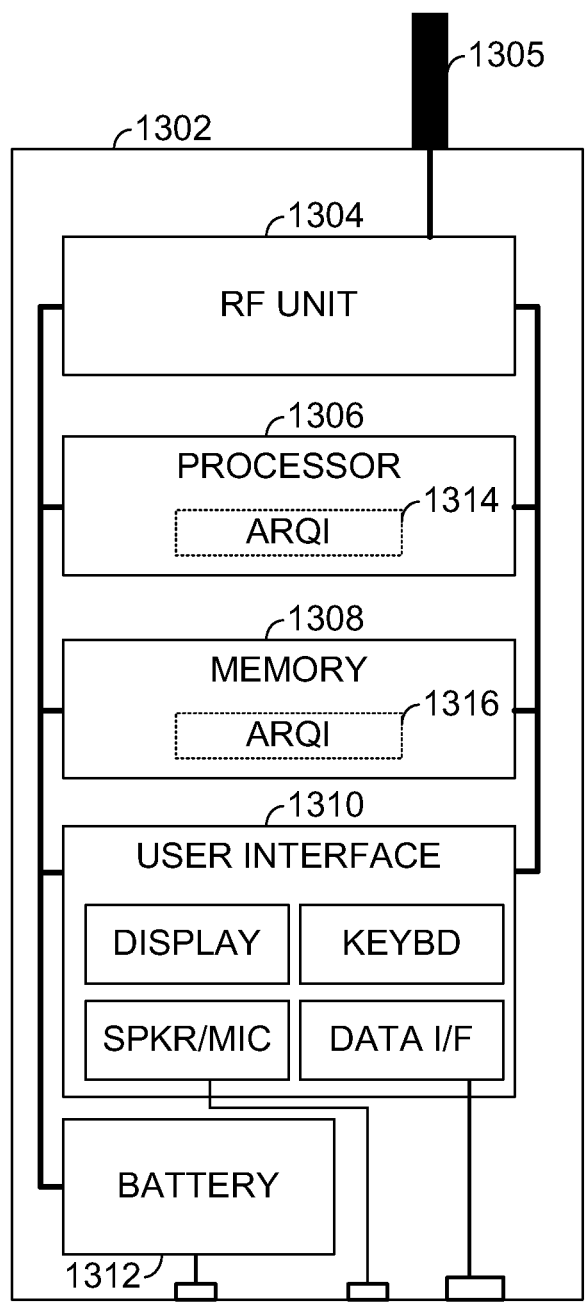
FIG. 13 is a block diagram illustrating a user terminal constructed according to the present invention.

FIG. 13 is a block diagram illustrating a user terminal 1302 constructed according to the present invention that performs the operations previously described herein. The user terminal 1302 supports a CDMA operating protocol, e.g., TS-95A, IS-95B, TS-2000, and/or various 3G and 4G standards. However, in other embodiments, the user terminal 1302 supports other operating standards.

The user terminal 1302 includes an RF unit 1304, a processor 1306, and a memory 1308. The RF unit 1304 couples to an antenna 1305 that may be located internal or external to the case of the user terminal 1302. The processor 1306 may be an Application Specific Integrated Circuit (ASIC) or another type of processor that is capable of operating the user terminal 1302 according to the present invention. The memory 1308 includes both static and dynamic components, e.g., DRAM, SRAM, ROM, EEPROM, etc. In some embodiments, the memory 1308 may be partially or fully contained upon an ASIC that also includes the processor 1306. A user interface 1310 includes a display, a keyboard, a speaker, a microphone, and a data interface, and may include other user interface components. The RF unit 1304, the processor 1306, the memory 1308, and the user interface 1310 couple via one or more communication buses/links. A battery 1312 also couples to and powers the RF unit 1304, the processor 1306, the memory 1308, and the user interface 1310.

Automatic Retransmission Request Software Instructions (ARQI) 1316 are stored in memory 1308. The ARQI 1316 are downloaded to the processor 1306 as ARQI 1314 for execution by the processor 1306. The ARQI 1316 may be programmed into the user terminal 1302 at the time of manufacture, during a service provisioning operation, such as an over-the-air service provisioning operation, or during a parameter updating operation.

Upon execution of the ARQI 1314, the user terminal 1302 performs operations according to the present invention previously described herein. The ARQI may also be partially executed by the RF unit 1304 in some embodiments. The structure of the user terminal 1302 illustrated is only an example of one user terminal structure. Many other varied user terminal structures could be operated according to the teachings of the present invention.

In the embodiments described herein, the base station 1202 serves as the transmitter while the user terminal 1302 serves as the receiver. However, the principles of the present invention may easily be applied such that the user terminal 1302 serves as the transmitter and the base station 1202 serves as the receiver.

In the embodiments described herein, partial or full soft combining may be performed at the receiver, depending on whether some of the data bits were retransmitted or all of the data bits were retransmitted due to the variable rate channel. Because this invention provides advantages for transmission over a variable rate channel, it provides particular advantages for applications where at any given instant, the channel is not shared, but dedicated to a particular user.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A device, comprising:
one or more antennas, configured to perform wireless communication;
processing hardware coupled to the one or more antennas, wherein the processing hardware is configured to:
encode a plurality of data bits of a data packet to produce a plurality of parity bits, wherein the plurality of data bits and the plurality of parity bits comprise an encoder packet;
form a first sub packet from the encoder packet as a first transmission, the first sub packet including the data bits and a first set of the parity bits and the first sub packet having a first coding rate;
transmit the first transmission to a receiver at a first bit rate using the one or more antennas;
receive a first indication from the receiver using the one or more antennas, wherein the first indication indicates that the data packet was not successfully received;
form a second sub packet from the encoder packet as a second transmission, the second sub packet including the data bits and a second set of parity bits that are different from the first set of parity bits and the second sub packet having a second coding rate that differs from the first coding rate; and
transmit the second transmission to the receiver at a second bit rate using the one or more antennas.

2. The device of claim 1, wherein the processing hardware comprises a memory medium storing program instructions and a processor to execute the program instructions.

3. The device of claim 1, wherein the processing hardware comprises an application specific integrated circuit (ASIC).

4. The device of claim 1, wherein the device comprises a user terminal.

5. The device of claim 1, wherein the device comprises a base station.

6. The device of claim 1, wherein the second bit rate differs from the first bit rate.

7. The device of claim 1, wherein the first bit rate and the second bit rate are the same bit rate.

8. The device of claim 1, wherein the second coding rate is less than the first coding rate.

9. A device, comprising:
one or more antennas, configured to perform wireless communication;
processing hardware coupled to the one or more antennas, wherein the processing hardware is configured to:
receive a first transmission from a transmitter at a first bit rate using the one or more antennas, wherein the first transmission comprises a first sub packet of an encoder packet, wherein the encoder packet comprises a plurality of data bits and a plurality of parity bits, wherein the first sub packet comprises the plurality of data bits and a first set of the plurality of parity bits, and wherein the first sub packet has a first coding rate;
determine that the first transmission was not successfully received;
transmit an indication to the transmitter using the one or more antennas, wherein the indication indicates that the data packet was not successfully received;
receive a second transmission from the transmitter at a second bit rate using the one or more antennas in response to the indication, wherein the second transmission comprises a second sub packet of the encoder packet, wherein the second sub packet has a second coding rate that differs from the first coding rate, and wherein the second sub packet comprises the plurality of data bits and a second set of the plurality of parity bits that are different from the first set of the plurality of parity bits.

10. The device of claim 9, wherein the processing hardware comprises a memory medium storing program instructions and a processor to execute the program instructions.

11. The device of claim 9, wherein the processing hardware comprises an application specific integrated circuit (ASIC).

12. The device of claim 9, wherein the device comprises a user terminal.

13. The device of claim 9, wherein the device comprises a base station.

14. The device of claim 9, wherein the processing hardware is further configured to:
use the first and second transmission to determine the plurality of data bits.

15. The device of claim 9, wherein the processing hardware is further configured to:
combine the first and second transmission to determine the plurality of data bits.

16. The device of claim 9, wherein determining that the first transmission was not successfully received comprises:
decoding the first transmission; and
determining that the decoding was unsuccessful.

17. The device of claim 9, wherein the processing hardware is further configured to:
determine that the first transmission was not successfully received;
transmit a second indication to the transmitter that the data packet was not successfully received;
receive a third transmission from the transmitter at a third bit rate in response to the second indication, wherein the third transmission comprises a third sub packet of the encoder packet, wherein the third sub packet has a third coding rate that differs from at least one of the first and second coding rate, and wherein the second sub packet comprises the plurality of data bits and a third set of the plurality of parity bits that are different from at least one of the first set of the plurality of parity bits and the second set of the plurality of parity bits.

18. The device of claim 9, wherein the second bit rate differs from the first bit rate.

19. The device of claim 9, wherein the first bit rate and the second bit rate are the same bit rate.

20. The device of claim 9, wherein the second coding rate is less than the first coding rate.

* * * * *